Feb. 14, 1961    B. DUBSKY ET AL    2,972,099
TRANSFORMER CONTROL SYSTEM
Filed Aug. 6, 1957
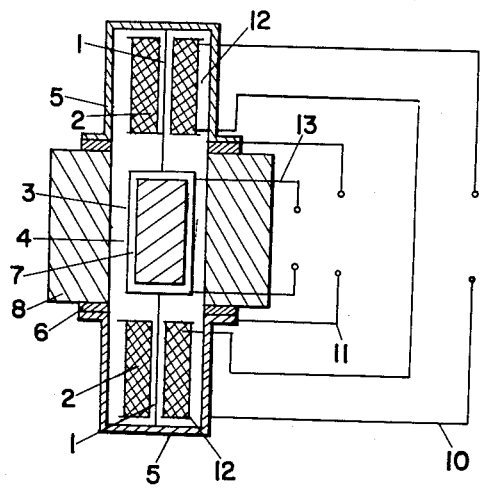
INVENTORS
Bořivoj Dubsky, Oldřich Straka,
Miloslav Pan
BY

United States Patent Office 2,972,099
Patented Feb. 14, 1961

2,972,099

TRANSFORMER CONTROL SYSTEM

Bořivoj Dubský, Oldřich Straka, and Miloslav Pan, all of Prague, Czechoslovakia, assignors to Výzkumný a zkušební letecký ústav, Letnany, near Prague, Czechoslovakia Filed Aug. 6, 1957, Ser. No. 676,679

Claims priority, application Czechoslovakia Aug. 11, 1956

2 Claims. (Cl. 323—52)

The present invention relates to an electromagnetic converter of D.C. voltages.

A number of D.C. converters are available, most of which are based on the electronic principle. Although these converters are adjustable, their stability is not satisfactory. They generally have a further common drawback, in that, due to a high noise level, they are unsuitable for converting very low voltages.

It is an object of the present invention to provide a D.C. converter which is simple, stable and of a sufficiently low noise level, so that even low D.C. voltages can be successfully converted. This object is achieved by suspending a coil upon a wire of ferromagnetic material in the magnetic field of a permanent magnet. The wire, which is fed with alternating exciting current, is surrounded by pick up coils. The flow of direct current through the coil suspended on the wire interacts with the field of the permanent magnet so that a torque is applied to the wire in order to twist the latter. Due to this twisting of the wire the normally cylindrical field resulting from the alternating exciting current is given an axial component and a voltage is induced thereby in the pick up coils, which voltage is proportional to the twisting of the wire and also to the direct current supplied to the coil suspended on the twisted wire.

The above, and other objects, features and advantages of the invention, will be apparent in the following detailed description of an illustrative embodiment which is to be read in connection with the accompanying drawing showing a diagrammatic view thereof.

The converter comprises a torsional wire 1, upon which a metal frame 4 for a coil 3 is suspended, said coil being connected to input terminals 13 supplying the D.C. voltage to be converted. The wire 1 is fixed, at its ends, to the bottoms of cases 5, which are fixed to a permanent magnet 8 surrounding the movable system. The permanent magnet 8 provides, with the moving coil 3, a system analogous to the so called Deprez measuring system. Insulating inserts are inserted between the magnet 8 and cases 5.

A closed space is thus formed by the permanent magnet 8 and both cases 5, in which space the coil 3 suspended on the torsional wire 1 is placed. This space is filled with a cooling liquid 12.

A magnetic core 7 is disposed inside the coil 3. The wire 1 is surrounded within cases 5 by pick-up coils 2, which are connected in series with each other and to the pick up terminals 10. The flanges of the cases 5 are connected with the terminals 11 of the A.C. exciting circuit so that the A.C. exciting current is fed to wire 1 by way of the cases 5.

When direct current is supplied to the coil 3 the input terminals 13, a torsional movement or twisting of the wire 1 takes place due to the passage of current through the coil 3 placed in the magnetic field of the permanent magnet 8. When this wire 1 is supplied with alternating current from the terminals 11 of the exciting circuit by way of the cases 5, an alternating cylindrical magnetic field originates therein, and this normally cylindrical field is deformed when the wire 1 is twisted, so that it includes a component in the direction of the axis of wire 1. This longitudinal or axial component induces in the pick up coils 2 an electromotive force which is transmitted to the pick up terminals 10, such force being proportional to the torsional movement or twisting of wire 1 and thus also to the direct current supplied to the coil 3 of the converter at terminals 13. It is apparent that, while the electromotive force induced in pick-up coils 2 will vary in accordance with variations in the input voltage at terminals 13, the amplitude of the pick-up voltage will depend upon the alternating exciting current. As the exciting current may be of an order, which could cause the burning of the wire 1, the wire 1 is submerged in the cooling liquid 12.

With a suitable arrangement, the voltage input at terminals 13 may be amplified as much as 50 times or more, that is, at the pick-up terminals 10, by using a suitable high frequency exciting current supplied to the terminals 11.

Since an alternating output voltage is obtained at the terminals 10, this voltage may be further amplified by common alternating amplifiers.

The converter of D.C. voltage according to this invention is simple in production, stable in operation and does not require any special adjustment. Compared to electronic converters, it works without noise even when very small voltages are to be converted.

We claim:

1. An electromagnetic converter for D.C. voltages comprising means producing a constant fixed magnetic field, a movable coil disposed in said magnetic field, means for supplying the D.C. voltages to be converted to said movable coil so that the latter is turned in said magnetic field, wires of ferro-magnetic material supporting said movable coil and being twisted by turning of the latter, means for feeding an alternating exciting current to said wires to produce a normally cylindrical magnetic field around the latter which is helically deformed in response to twisting of said wires so that the field produced by the exciting current then has a component in the direction of the axis of said wires, and pick-up coils surrounding said wires and having alternating output voltages induced therein by said component in the direction of the axis of the wires, which output voltages vary in accordance with the D.C. voltages to be converted and have magnitudes depending upon the magnitude and frequency of said alternating exciting current.

2. An electromagnetic converter for D.C. voltages comprising a magnet producing a constant, fixed magnetic field, metal cases extending from the opposite sides of said magnet and insulated from the latter to define a closed space, a movable coil disposed in said magnetic field within said closed space, axially aligned ferro-magnetic wires extending from said coil through said closed space and connected to said cases to suspend said movable coil, input terminals for receiving the D.C. voltages to be converted and connected to said movable coil so that the voltages to be converted interact with said magnetic field to turn said movable coil and cause twisting of said wires, means connected to said metal cases for passing an alternating exciting current through said wires for producing a normally cylindrical magnetic field which is helically distorted by the twisting of said wires to provide a component of said field resulting from the exciting current in the direction of the axis of said wires, pick-up coils surrounding said wires and having alternating output voltages induced therein by said component in the direction of the axis of the wires and which varies in accordance with the input voltages and has magnitudes depending upon the magnitude and frequency of the alternating exciting current, and a cooling medium in said closed space enveloping said wires to permit the use of large exciting currents without excessive heating of said wires.

References Cited in the file of this patent

UNITED STATES PATENTS

| | | |
|---|---|---|
| 2,486,641 | Gilbert | Nov. 1, 1949 |
| 2,511,178 | Roters | June 3, 1950 |